United States Patent [19]

Kobayashi

[11] Patent Number: 4,574,378

[45] Date of Patent: Mar. 4, 1986

[54] MULTIPLE ACCESS SYSTEM AND METHOD

[75] Inventor: Kazutomo Kobayashi, Tokyo, Japan

[73] Assignee: NEC Corporation, Tokyo, Japan

[21] Appl. No.: 503,264

[22] Filed: Jun. 10, 1983

[30] Foreign Application Priority Data

Jun. 14, 1982 [JP] Japan ............................. 57-101913
Feb. 24, 1983 [JP] Japan ............................. 58-29741
Mar. 11, 1983 [JP] Japan ............................. 58-40057

[51] Int. Cl.$^4$ ............................................. H04J 3/06
[52] U.S. Cl. ............................................. 370/104; 370/94
[58] Field of Search .................. 370/85, 93, 94, 95, 370/104; 340/825.5

[56] References Cited

U.S. PATENT DOCUMENTS

| 4,161,786 | 7/1979 | Hopkins et al. | 370/85 |
| 4,199,662 | 4/1980 | Lowe, Jr. | 370/85 |
| 4,210,780 | 7/1980 | Hopkins et al. | 370/85 |
| 4,281,380 | 7/1981 | DeMesa, III et al. | 370/94 |
| 4,409,592 | 10/1983 | Hunt | 370/94 |
| 4,439,763 | 3/1984 | Limb | 370/85 |
| 4,439,856 | 3/1984 | Ulug | 370/85 |
| 4,464,749 | 8/1984 | Ulug | 370/94 |

OTHER PUBLICATIONS

"Ethernet: Distributed Packet Switching for Local Computer Networks", Metcalfe et al., Communications of the ACM, vol. 19, #7, Jul. 1976.

Primary Examiner—Douglas W. Olms
Assistant Examiner—Kenneth I. Rokoff
Attorney, Agent, or Firm—Charles E. Pfund

[57] ABSTRACT

In a multiple access system for performing packet communication involving sharing of a single communication medium by a plurality of users, the single communication medium is divided into a plurality of channels. Each user monitors the condition of each channel, and probability of packet transmission to each channel is controlled in accordance with a monitored result.

11 Claims, 13 Drawing Figures

MULTIPLE ACCESS SYSTEM AND METHOD

BACKGROUND OF THE INVENTION

1. Field of the Invention

The present invention relates to multiple access system and method of packet communication involving the sharing of a single communication medium such as a single satellite by a plurality of users.

2. Description of the Prior Art

Figure 1:
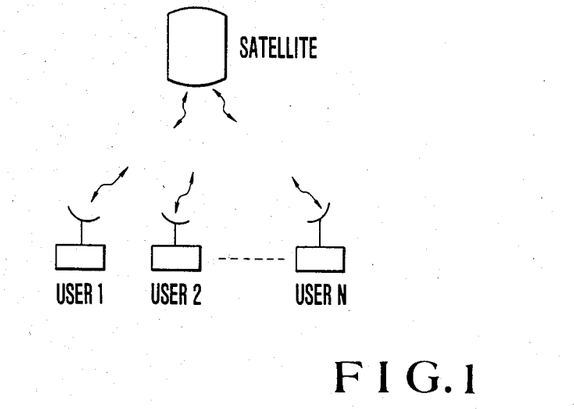
FIG. 1 shows the principle of satellite communication.
Figure 2:
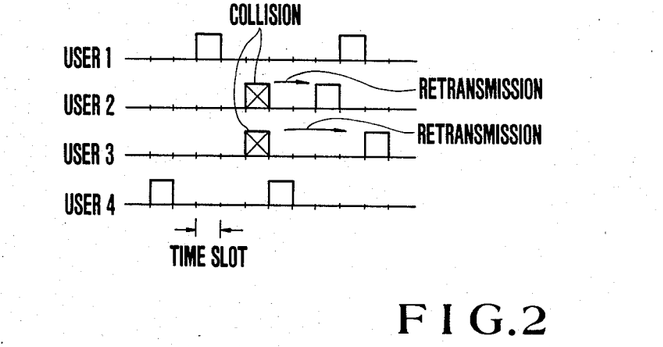
FIG. 2 shows a slotted ALOHA scheme.

TDMA (time division multiple access) and ALOHA are well-known as multiple access systems using a shared communication medium such as a satellite shown in FIG. 1. The TDMA scheme divides a channel into time slots at intervals comprising one-packet transmission time. When the number of users is N (positive integer), N slots are given as one frame. Each slot of the frame is permanently assigned to each user. The TDMA scheme is very effective when the number of users is small and a heavy traffic load occurs. However, when the number of users is large and only a light traffic load occurs, the utilization efficiency of the channel is degraded, and an average delay time is increased, resulting in inconvenience. Furthermore, the TDMA scheme is not suitable when changes in the traffic load are great. The ALOHA system includes a basic ALOHA scheme and a slotted ALOHA scheme. The slotted ALOHA scheme is an improvement upon the basic one and will be described hereinafter. In the slotted ALOHA scheme as shown in FIG. 2, a channel is divided into time slots in the same manner as in the TDMA scheme. If a user wants to transmit a packet, he immediately transmits a packet in synchronism with the given time slot. If packets from the plurality of users collide with each other, retransmissions are performed at random. The slotted ALOHA scheme is very effectively utilized when the number of users is great and a traffic load is light (i.e., a low load is imposed). However, a maximum throughput of this scheme is as low as 0.368 with respect to a channel capacity defined as 1. When a number of packets which exceeds the maximum throughput is transmitted, collisions frequently occur, resulting in a deadlocked condition.

When the number of users is great and the traffic load varies in a wide range, the conventional schemes (i.e., the TDMA and slotted ALOHA schemes) cannot be applied. In order to compensate for the drawbacks of the conventional schemes, an optimal adaptive scheme for multiple access broadcast communication is proposed to automatically select one of the ALOHA and TDMA modes as needed, as described by L. Kleinrock and Y. Yemini, "An Optimal Adaptive Scheme for Multiple Access Broadcast Communication", ICC Conf. Proc., Chicago, IL., June 1977. The ALOHA mode is adopted in the case of a light traffic load, while the TDMA mode is adopted in the case of a heavy traffic load. In order to perform the above operation, however, a total number of users requesting packet transmission must be signalled to each user. Therefore, information indicating the total number of users requesting packet transmission must be transmitted to each user through a subchannel, resulting in inconvenience. According to a scheme described by Glenn Ricard and Ashok K. Agrawala, "Dynamic Management of Packet Radio Slots", presented at the Third Berkely Workshop on Distributed Data Management and Computer Networks, August 1978, each user first uses the ALOHA mode while monitoring the channel. When the traffic load on the channel becomes heavy, the mode is switched to the TDMA mode. Furthermore, when an empty slot occurs in the TDMA mode, this time slot is set in the ALOHA mode again. A subchannel is not required in the above-mentioned scheme. However, where a few users frequently transmit packets to render the channel busy, even if the ALOHA mode is switched to the TDMA mode, the remaining users cannot transmit packets. In order to eliminate this inconvenience, predetermined time slots must be allotted to those users who most frequently transmit packets. In other words, in this scheme, an additional allocation operation is required. Therefore, this conventional scheme is difficult to update in accordance with a change in the number of users. In fact, practical implementations for this scheme have not yet been proposed.

SUMMARY OF THE INVENTION

It is a major object of the present invention to provide a multiple access system and method which allow effective utilization of a channel under distributed control even if a traffic load of each user varies in a wide range.

Another object of the present invention is to provide a multiple access system capable of performing an ALOHA mode during light traffic and assigning time slots to each user in accordance with TDMA mode during a heavy traffic.

Still another object of the present invention is to provide a multiple access system capable of preventing shutout of the user.

Still another object of the present invention is to provide a multiple access system capable of properly assigning time slots to each user even in the case of an irregular, high traffic load.

According to one aspect of the invention, there is provided a method for performing packet communication in a multiple access system comprising:

sharing a single communication medium by a plurality of user stations through a plurality of channels;

monitoring by each user station of the state of each channel; and controlling the probability of packet transmission in accordance with the monitored result.

According to another aspect of the invention, there is provided a multiple access system for performing packet communication involving sharing of a single communication medium by a plurality of users through a plurality of channels such that each user monitors a state of each channel and the probability of packet transmission is controlled in accordance with the monitored result, comprising:

an interface section for linking data together as a packet;

a modem section for modulating/demodulating a packet, said modem section including a carrier detector for detecting whether or not the channel is being used and for generating one of empty and busy signals;

a network control section for performing access control, said network control section including a collision detector for detecting a transmitting packet and a delayed receiving packet so as to detect a collision of the transmitting packet with another transmitting packet, said collision detector generating a success signal when the transmitting packet and the delayed receiving packet coincide with each other and a collision signal when the transmitting packet and the delayed receiving packet do not coincide, a retransmitter for retransmitting a packet identical with the transmitting packet when the transmitting packet collides with said delayed receiving packet, and a control circuit for receiving a slot sync pulse, one of the busy and empty signals, one of the success and collision signals, and a packet arrival pulse, and for generating a control signal to control packet transmission; and an RF section for converting an IF signal to a high frequency transmission signal and vice versa.

DETAILED DESCRIPTION OF THE PREFERRED EMBODIMENT

Preferred embodiments of the present invention will be described with reference to the accompanying drawing. The principle of a multiple access system according to the present invention will first be described.

Figure 3:
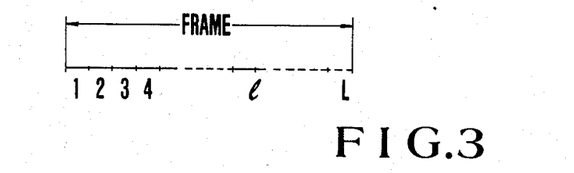
FIG. 3 shows a frame consisting of L time slots and useful in explaining the principle of this invention.

As shown in FIG. 3, in slotted ALOHA, time is divided into slots of duration equal to a single packet transmission time. Consecutive L slots form a frame as in TDMA. A retransmission algorithm identical to that of slotted ALOHA is employed. On the above framework a new parameter set, Pij's, is introduced.

Figure 4:
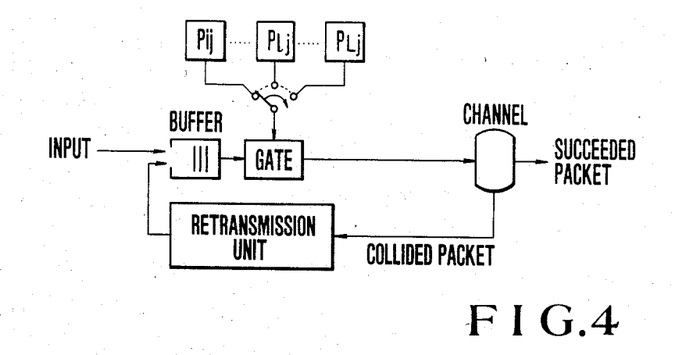
FIG. 4 shows a transmission model for j-th user in accordance with this invention.

As is shown in FIG. 4, when j-th user has Pij's (i=1−L), a conditional probability is assigned to its i-th slot, with which it transmits a packet when it has any. The role of the parameter set is well illustrated by the following two extreme cases.

If all Pij's are fixed to unity, the notion of the frame disappears and slotted ALOHA is obtained. Throughout the specification this situation is called the ALOHA mode.

If the size of the frame is set equal to the number of the users N and Pij's are selected as $$P_{ij} = 1 \text{ for } i = j$$

$$= 0 \text{ otherwise.}$$

then, the system works as TDMA. We refer to this pattern of Pij's as the TDMA mode.

It can be easily imagined now that if it is possible to adjust the parameters depending on the channel traffic, efficient access schemes will emerge. In fact, as will be shown later many adaptive strategies proposed previously can be regarded as to have the parameter set implicitly and they are characterized by the way in which the virtual parameter are adjusted.

According to this invention, a scheme is proposed in which the parameters are adaptively adjusted so as to maximize the channel throughput. The slotted ALOHA throughput is given by the well-known formula $$S = \sum_{j=1}^{N} G_j \prod_{\substack{k \neq j \\ k=1}}^{N} (1 - G_k) \tag{1}$$

where $G_j$ is the probability that j-th user wants to transmit a packet in some slot (see N. Abramson, "The throughput of packet broadcasting channels", IEEE Trans. Commun., vol. COM-25, pp. 117–128, January 1977). Applying (1) to each slot of all users, the system throughput taking Pij's into account is obtained as $$S = \frac{1}{L} \sum_{i=1}^{L} \sum_{j=1}^{N} P_{ij} G_j \prod_{\substack{k \neq j \\ k=1}}^{N} (1 - P_{ik} G_k) \tag{2}$$

To maximize cost function a simple gradient search algorithm is employed. The conditional probability $P_{ln}$ associated with the l-th slot of the n-th user, is updated at m-th time frame by $$P_{ln}^{m+1} = P_{ln}^{m} + \alpha \frac{\partial S}{\partial P_{ln}} \tag{3}$$

where $\alpha$ is a positive adaptation constant. By taking a partial derivative of (2) with respect to $P_{ln}$, the gradient is given as $$\frac{\partial S}{\partial P_{ln}} = \frac{G_n}{L} \left\{ \prod_{\substack{j \neq n \\ j=1}}^{N} (1 - P_{lj} G_j) - \sum_{\substack{j \neq n \\ j=1}}^{N} P_{lj} G_j \prod_{\substack{k \neq n, j \\ k=1}}^{N} (1 - P_{lk} G_k) \right\} \tag{4}$$

Equation (4) implies that the gradient can be expressed in terms of the probability of two events. Let $A_{ln}$ be the event "the l-th slot is open for the n-th user" and let B be the event "only one user other than the n-th transmits a packet at the l-th slot". Then, the first term in the brace of (4) is Prob [$A_{ln}$] and the second is Prob [$B_{ln}$]. It is to be noted here that those two events are not common to all users but they are defined for each user. Also noteworthy is that the frame need not be synchronized among users, in other words, the l-th slot of the n-th user need not be the l-th slot of the m-th user.

Assuming that the collision between other users' packets can be detected, each user can observe or monitor whether the events defined to its own occur or not. The probability of these events and consequently the gradient can be estimated from repeated observations or more practically by the stochastic gradient method. A natural definition of the stochastic gradient $\delta_n$ is as follows:

$$\delta_{ln} = 1 \text{ for } A_{ln} \tag{5}$$
$$= -1 \text{ for } B_{ln}$$
$$= 0 \text{ for } C_{ln}$$

where $C_{ln}$ denotes the event "more than two users, except for the n-th, transmit at the l-th slot", i.e., $\overline{A_{ln} \cup B_{ln}}$.

However, an obvious drawback will arise if the above definition is applied to the adaptation. Since, if all Pij's and Gi's happen to be unity, the values of Pij's will never be changed any more and system deadlock results. This is because the original cost function is not well conditioned over the parameter space to justify the gradient algorithm and the above situation can be regarded as a trap. In the trap state the event $C_{ln}$'s or the collisions are always observed. Therefore, an intuitive remedy to avoid getting into this is to evaluate the stochastic gradient negative so that Pij's are decreased when the event $C_{ln}$ is encountered. The reason for decreasing the Pij's is not only because there is no way to increase, but because it is justified by the following consideration. The outcome of the event $C_{ln}$ decreases both Prob [$A_{ln}$] and Prob [$B_{ln}$]. But as Gi's tend to increase due to the collisions, decrease in the former is greater than that in the latter. Thus, if the system model includes feedback effects, a natural direction to move Pij's upon collisions is negative.

Then, an extremely simple algorithm $$P_{ln}^{m+1} = P_{ln}^m + \alpha \delta_{ln} \tag{6}$$

with $\delta_{ln}$ positive for $A_{ln}$, negative for $\overline{A_{ln}}$ is reached. This means that as shown in the following Table, each user increases its parameters if no one else is there and decreases them if someone else is there in the slot. Since Pij's are the probabilities, additional operations limiting them between 0 and 1 are needed besides (6).

TABLE

| | The adaptation algorithm | |
|---|---|---|
| | OTHERS | |
| SELF | IDLE | TRANS |
| IDLE | (EMPTY) INCREASE | (NON-EMPTY) DECREASE |
| TRANS | (SUCCESS) INCREASE | (COLLISION) DECREASE |

For some simple traffic models, the behavior of the algorithm can be predicted without resorting to a computer simulation. When every user has low traffic rate, channel empty is more frequently encounterd than the other events. Thus, all the Pij's keep on increasing until they reach unity making the system converge to the ALOHA mode.

If the traffic of all users increases, collisions begin to dominate and all Pij's decrease toward zero, but due to statistical fluctuations a particular user's i-th slot probability, say Pin, remains greater than that of the other users. Since it is quite natural in this situation to assume that each user has a number of packets to transmit in the buffer, a user with larger conditional probability will have greater probability of success. Therefore, once the above situation is reached, the n-th user will increase its Pin forcing the others' $P_{ik}$'s ($K \neq \eta$) to zero. In like manner, other slots will be occupied by other users. If the traffic rate is equally high among users, each user will have one slot to its own and the TDMA mode results.

As the adaptation algorithm given in the previous Table has a high degree of freedom, a situation that some users occupy the whole channel and some are shut out of the system may occur. This seems somewhat awkward from a practical point of view. Therefore, maximizing the throughput under the constraints $$\sum_{i=1}^{L} P_{ij} \geq \eta_j, j = 1 \sim N \tag{7}$$

is preferred in practical applications. This is done by introducing Lagrange multipliers λn's. The adaptation algorithm (6) is modified as $$P_{ln}^{m+1} = P_{ln}^m + \alpha(\delta_{ln} + \lambda_n^m) \tag{8}$$

$$\lambda_n^{m+1} = \max\left[0, \lambda_n^m - \beta\left(\sum_{i=1}^{L} P_{in}^m - \eta_n\right)\right] \tag{9}$$

where $\beta$ is an adaptation constant, and $\eta_n$ is the minimum number of slots which j-th user requires.

The constraints, however, should not always be rigid. Because, if the algorithm tries to keep satisfying the constraints even when there exists heavy traffic beyond the channel capacity, throughput decreases and the channel capacity cannot be attained. Avoiding this is done by limiting λn's not to exceed unity.

Figure 5:
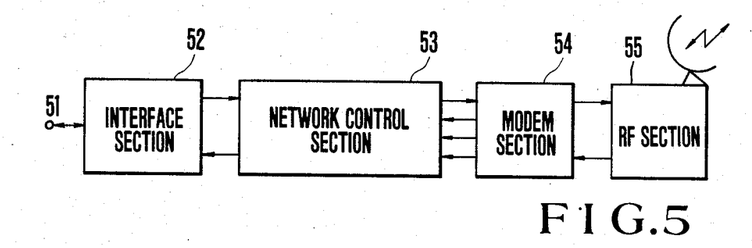
FIG. 5 is a block diagram showing the basic arrangement of a multiple access system incorporating the present invention.

Referring now to FIG. 5, an overall construction of a multiple access system on a time multiplexed basis incorporating the present invention will be described. An input/output terminal 51 is connected to a data terminal device. An interface section 52 processes data transmitted from the data terminal device to the terminal 51 so as to link data together as a packet. The packet is then supplied to a network control section 53. The interface section 52 also decomposes the pocket from the network control section 53 and sends it to the data terminal device through the terminal 51.

The network control section 53 mainly performs access control. A modem section 54 performs modulation and demodulation. An RF section 55 increases a frequency of an IF signal to a transmission frequency. The signal having the transmission frequency propagates through a transmitting antenna. The RF section 55 also decreases the frequency of a signal received at a receiving antenna to produce an IF signal. The IF signal is then supplied to the modem 54. The basic configuration of the apparatus is the same as that of the slotted ALOHA scheme, but the internal arrangements of the network control section 53 and the modem 54 greatly differ from those of the slotted ALOHA scheme.

Figure 6:
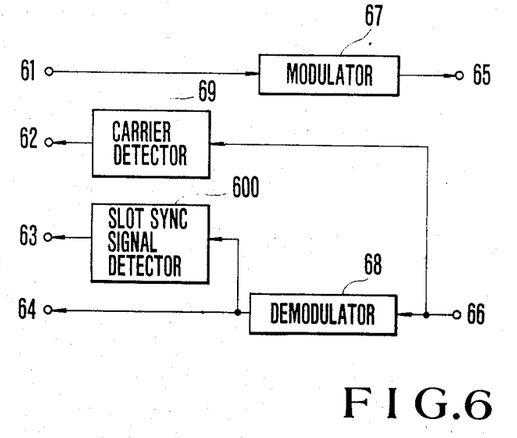
FIG. 6 is a block diagram of a modem section (54) of the system shown in FIG. 5.

FIG. 6 is a block diagram of the modem section 54 shown in FIG. 5. An input terminal 61 and output terminals 62, 63 and 64 of the modem section 54 are connected to the network control section 53. Input and output terminals 66 and 65 of the modem section 54 are connected to the RF section 55. A modulator 67 receives and modulates the packet transmitted through the input terminal 61 and produces the modulated data from the output terminal 65. A demodulator 68 receives and demodulates the modulated signal from the input terminal 66 and produces a demodulated signal to the output terminal 64.

A carrier detector 69 detects whether or not the channel is busy. More particularly, the carrier detector 69 detects a level of the modulated signal to be supplied to the demodulator 68. If the signal level exceeds a predetermined threshold, the carrier detector 69 determines that the channel is busy and then generates a busy signal. Otherwise, the carrier detector 69 determines that the channel is empty and then generates an empty signal. The busy or empty signal is supplied to the network control section 53 through the output terminal 62. A slot sync signal detector 600 extracts a slot sync signal which continuously propagates along the channel and supplies a sync pulse to the network control section 53 through the terminal 63.

The modulator 67, the demodulator 68 and the slot sync signal detector 600 are arranged in an apparatus for performing the slotted ALOHA scheme. The modem section 54 also has the carrier detector 69, as described above.

Figure 7:
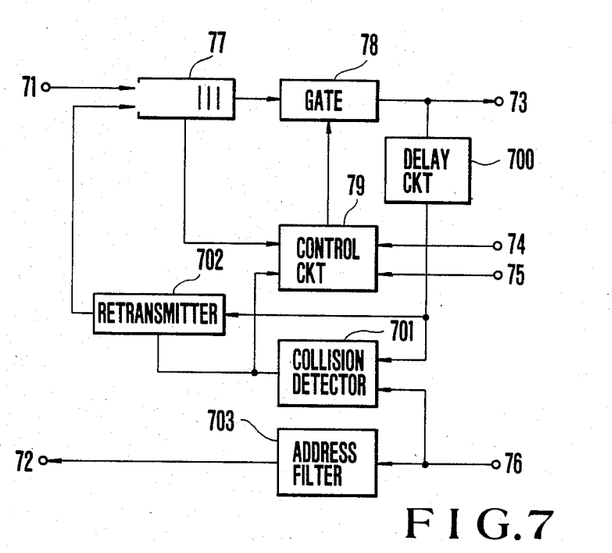
FIG. 7 is a block diagram showing a first embodiment of a network control section (53) of the system shown in FIG. 5.

FIG. 7 is a block diagram of a first embodiment of the network control section 53.

Input and output terminals 71 and 72 of the network control section 53 are connected to the interface section 52. An output terminal 73 and input terminals 74 to 76 of the network control section 53 are connected to the modem section 54. The packet supplied to the input terminal 71 is temporarily stored in a buffer 77. When a gate circuit 78 is turned on, the packet is supplied to the modem section 54 through the output terminal 73. The gate circuit 78 is turned ON/OFF in accordance with a gate control signal from a control circuit 79.

The packet is also supplied from the gate circuit 78 to a delay circuit 700. The delay circuit 700 delays the packet from the gate circuit 78 by a propagation delay time. The delay signal is then supplied to a collision detector 701. The collision detector 701 serves to detect whether or not the received packet collides with a packet from any other user station. It is here noted that each channel is assumed to be a broadcast channel, so that a packet transmitted from a given user station can be received by the same. The collision detector 701 compares the packet received at the terminal 76 with the packet from the delay circuit 700. If the collision detector 701 detects a coincidence between these packets, it generates a success signal. Otherwise, the collision detector 701 geneates a collision signal. A retransmitter 702 generates a collision signal. A retransmitter 702 temporarily receives the packet from the delay circuit 700. When the collision signal from the collision detector is supplied to the retransmitter 702, the retransmitter 702 delays the packet from the delay circuit 700 in accordance with a given distribution. The delayed packet is returned to the buffer 77. However, when the success signal is supplied to the retransmitter 702, the retransmitter 702 removes the packet. An address filter 703 only extracts a packet (among the packets supplied to the terminal 76) which is addressed thereto. The selected packet is then supplied from the address filter 703 to the interface section 52. The control circuit 79 receives the busy or empty signal from the terminal 74, the slot sync pulse from the terminal 75, an arrival pulse from the buffer 77, and the success or collision signal from the collision detector 701. The control circuit 79 then controls the gate circuit 78 in accordance with the above-mentioned input signals. Thus, it will be appreciated that terminals 61, 62, 63 and 64 of the modem section 54 are connected to termials 73, 74, 75 and 76 of the network control section 53, respectively. The control circuit 79 will be described in detail hereinafter.

Figure 8:
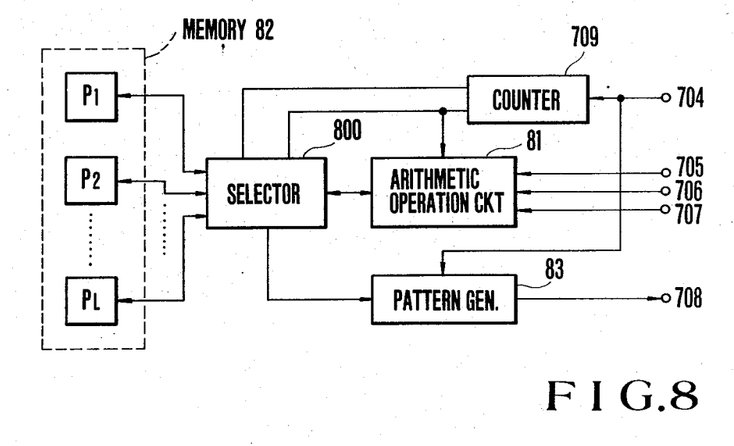
FIG. 8 is a block diagram of one embodiment of a control circuit shown in FIG. 7.

FIG. 8 is a block diagram of one embodiment of the control circuit 79. The control circuit 79 receives the slot sync pulse, the busy or empty signal, the success or collision signal, and the packet arrival pulse at input terminals 704, 705, 706 and 707, respectively, and generates a control signal from its output terminal 708 so as to control the ON/OFF operation of the gate circuit 78. A counter 709 counts slot sync pulses in units of L (one frame). Present count data I (corresponding to a given slot number l) of the counter 709 is decreased by the number of slots corresponding to the transmission delay time in units of L so as to obtain data I' (corresponding to a slot number l'). The counter 709 supplies only the data I' to an arithmetic and logic circuit 81 through a selector 800. This is because two slot numbers are required when a packet is transmitted during a given slot and is received during a different lot under the conditions of a lengthy transmission delay.

The selector 800 reads out a parameter $P_l$ corresponding to the slot number l and a parameter $P_{l'}$ corresponding to the slot number l'. The parameter $P_l$ is supplied to a pattern generator 83, and the parameter $P_{l'}$ is supplied to the arithmetic and logic unit 81. The arithmetic operation unit 81 updates the parameter P which is then stored in a memory 82. The pattern generator 83 uses as the probability data the parameter from the selector 800 and supplies the control signal to the gate circuit 78 through a terminal 708. The gate circuit 78 is then turned on. Thus, it will be appreciated that terminals 74 and 75 in FIG. 7 correspond to terminals 705 and 704 in FIG. 8, respectively, and that terminals 706, 707 and 708 in FIG. 8 are connected to collision detector 701, buffer 77 and gate circuit 78 in FIG. 7, respectively.

Figure 9:
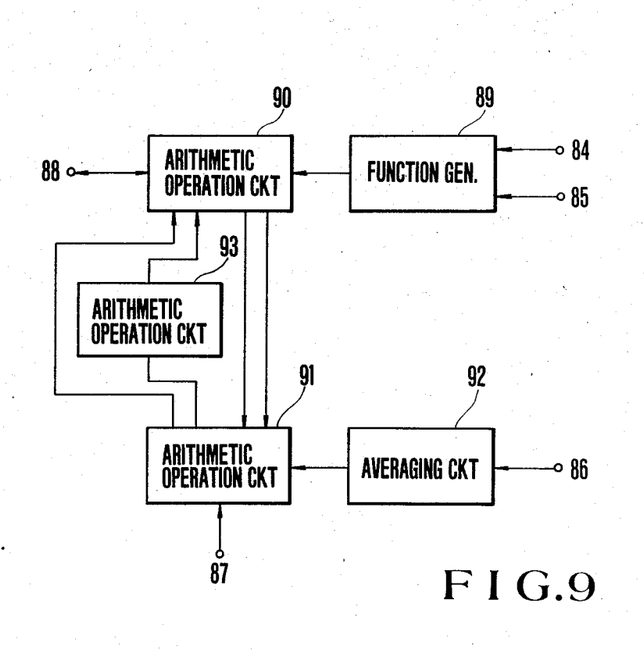
FIG. 9 is a block diagram of an arithmetic operation circuit 81 shown in FIG. 8.

FIG. 9 is a block diagram of the arithmetic operation unit 81. The arithmetic operation unit 81 receives the busy or empty signal, the success or collision signal, the packet arrival pulse, and the slot number (l') data at input terminals 84, 85, 86 and 87 thereof, respectively. The arithmetic operation unit 81 then generates/receives the parameter $P_{l'}$ through the terminal 88. Thus, it will be appreciated that terminals 84, 85 and 86 in FIG. 9 correspond to terminals 705, 706 and 707, respectively, and that terminals 87 and 88 in FIG. 9 are respectively connected to counter 709 and selector 800 in FIG. 8. A functon generator 89 generates function data δ in response to the signals supplied to the terminals 84 and 85 as follows:

$$\delta = \begin{cases} 1 & \text{(in the presence of an empty/success signal)} \\ -1 & \text{(in the absence of an empty/success signal)} \end{cases} \tag{10}$$

The function data is then supplied to an arithmetic operation circuit 90. The arithmetic operation circuit 90 performs the following operation in acordance with the function data δ from the function generator 89 and the Lagrangean constant updated by an arithmetic operation circuit 91 through an arithmetic operation circuit 93:

(i) $W_1 \leftarrow P + a(\delta + \lambda)$ \hfill (11)

and subsequent $$\text{(ii) } P \leftarrow W_1 \quad \text{for } 0 \leq W_1 \leq 1 \qquad (12)$$
$$P \leftarrow 0 \quad \text{for } W_1 < 0$$
$$P \leftarrow 1 \quad \text{for } W_1 > 1$$

where $\alpha$ is a small positive number. The parameter P obtained from expression (28) is supplied as the updated parameter $P_l'$ from the terminal 88 to the memory 82 and is stored therein. At the same time, the following operation is performed:

$$Q \leftarrow Q + P \qquad (13)$$

where Q is $\Sigma P_l$ and the obtained Q is retained.

An averaging circuit 92 averages the number of input pulses from the terminal 86 so as to obtain an arrival frequency $\hat{\sigma}$. The arrival frequency is multiplied by L which is the number of channels. Product or resultant data $\hat{\sigma}L$ corresponds to the number of slots required by the user. As the slot number changes from L to 1 with the slot number data supplied from the counter 709 through terminal 87, the arithmetic operation circuit 91 receives the constant $\lambda$ and the data Q from the arithmetic operation circuit 90 at the terminal 87 thereof and performs the following operation;

$$\text{(i) } W_2 \leftarrow \lambda - \beta(Q - \sigma L) \qquad (14)$$
$$Q \leftarrow 0$$

and subsequent $$\text{(ii) } \lambda \leftarrow 0 \quad \text{for } W_2 < 0 \qquad (15)$$
$$\lambda \leftarrow W_2 \quad \text{for } W_2 \geq 0$$

here $\beta$ is a small positive number. The computed Q and are returned to the arithmetic operation circuit 90.

The arithmetic operation circuit 93 computes data obtained from the arithmetic operation circuit 91 as follows:

$$\lambda \leftarrow \min\{\lambda, \lambda_0\} \text{ for } \lambda_0 \lesssim 1 \qquad (16)$$

The computed result is supplied to the arithmetic operation circuit 90. The data q obtained from the arithmetic operation circuit 91 is also supplied per se to the arithmetic operation circuit 90.

It should be understood that in the arithmetic operation circuit 81 as materialized in the form of the FIG. 9 arrangement, constraints of expressions (14) and (16) are held so that in addition to the basic operation of the multiple access system wherein an ALOHA mode is performed during a light traffic and time slots are assigned to each user in accordance with a TDMA mode during a heavy traffic, it is possible to properly assign time slots to each user even in the case of an irregular, high traffic; if the averaging circuit 92 is eliminated, $\hat{\sigma}L = 1$ stands in expression (14) so that in addition to the basic operation, it is possible to prevent shutout phenomenon although the proper assignment of the time slots is not assured; and if the arithmetic operation circuits 91 and 93 and the averaging circuit 92 are eliminated, $\lambda = 0$ stands in expression (11) so that only the basic operation is assured, being subject to the shutout phenomenon.

The arrival frequency $\hat{\sigma}$ of the transmitted packet is used in the above embodiment. However, an arrival frequency $\hat{\sigma}$ which includes the retransmitted packets may alternatively be used. Furthermore, if the minimum required number of slots is defined as $L_0$, and $\hat{\sigma}L < L_0$, $L_0$ may be given instead of $\hat{\sigma}L$. In this case, even if the traffic load is very light, a given user station can request $L_0$ slots. Instead of $\hat{\sigma}L$, the number of packets stored in the buffer 77 may be used to determine the degree of communication necessity. Alternatively, the degree of communication necessity may be determined in accordance with a priority order of received packets.

Figure 10:
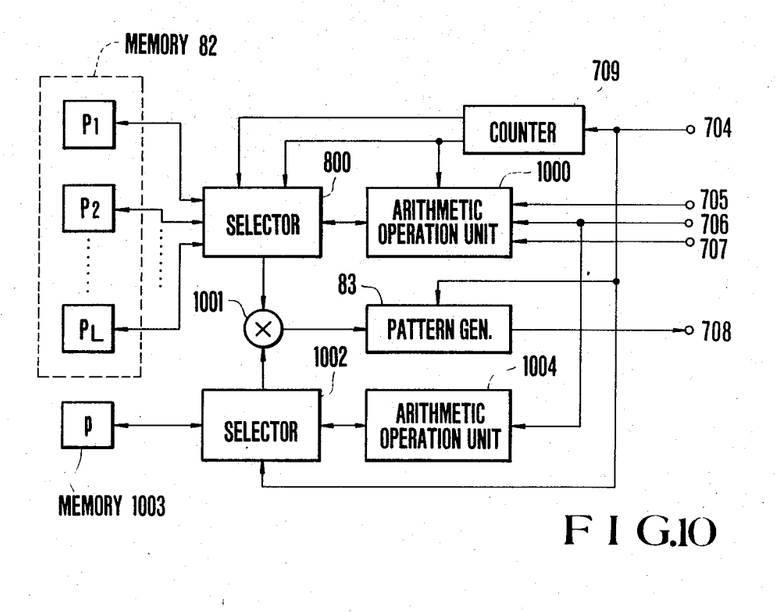
FIG. 10 is a block diagram of another embodiment of the control circuit shown in FIG. 7.

FIG. 10 is a block diagram of another embodiment of the control circuit 79 shown in FIG. 7. In this embodiment, the slot sync pulse, the busy or empty signal, the success or collision signal and the packet arrival pulse are also received at input terminals 704, 705 and 706, respectively, as in FIG. 8. The control circuit then generates a gate control signal to control the ON/OFF operation of the gate circuit 78 through the output terminal 708. A counter 709 counts slot sync pulses in units of L (one frame). Present count data (corresponding to a given slot number l) of the counter 709 is decreased by the number of slots corresponding to the transmission delay time in units of L so as to obtain (modified count) data l'. The counter 709 supplies only the data l' to an arithmetic operation unit 1000 through a selector 800. This is because two slot numbers are required when a packet is transmitted during a given slot and is received during a different slot under the conditions of a great transmission delay.

The selector 800 selects parameter data Pl corresponding to the slot number l and probability data $P_l'$ (to be also referred to as a parameter) corresponding to the slot number l' from a memory 82 which stores L parameters. The parameter $P_l$ is supplied to a multiplier 1001, and the parameter $P_l'$ is supplied to an arithmetic operation unit 1000. The arithmetic operation unit 1000 updates the parameter $P_l'$, and updated data is returned to the selector 800. The selector 800 serves to store the updated data in the memory 82.

It should be noted that the arithmetic operation circuit 1000 updates the parameter $P_l$ in accordance with an algorithm (e.g., $P_{ln}^{T+1} = P_{ln}^T + \alpha\delta_{ln}$ for $\delta_{ln} = 1$ or $-1$, where T is the unit time corresponding to L slots, and $\alpha$ is a small positive number called a correction coefficient).

A selector 1002 reads out the parameter p from a memory 1003 and supplies this data to the multiplier 1001 and to an arithmetic and logic unit 1004. The parameter updated by the arithmetic and logic unit 1004 is stored in the memory 1003.

The multiplier 1001 multiplies the parameter $P_l'$ from the selector 800 with the parameter p from the selector 1002. Product data is then supplied to a pattern generator 83. In the pattern generator 83, the product data supplied from the multiplier 1001 is detected as a probability and generates a gate control signal which is supplied to the gate circuit 78 through the output terminal 707 in accordance with the obtained probability.

Figure 11:
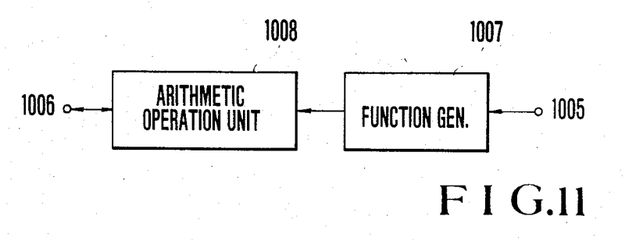
FIG. 11 is a block diagram of an arithmetic operation circuit (1004) shown in FIG. 10.

FIG. 11 is a block diagram of the arithmetic operation unit 1004 shown in FIG. 10. The arithmetic operation unit 1004 receives the success or collision signal from its input terminal 1005 (corresponding to terminal 706 in FIG. 10) and generates or receives a parameter p from its terminal 1006. A function generator 1007 generates a function value $\xi$ as follows:

$$\xi = -1 \text{ (in the presence of a collision signal)} \qquad (16)'$$
$$= \xi_0 > 0 \text{ (in the absence of collision signal)}$$

The function value ξ is supplied to an arithmetic operation circuit 1008. The arithmetic operation circuit 1008 updates the parameter p supplied to the terminal 1006 in accordance with the function value ξ as follows:

(i) $W \leftarrow P + r\xi$ and subsequent (ii) $P \leftarrow 0$ for $W < 0$
$P \leftarrow W$ for $0 \leq W \leq 1$
$P \leftarrow 1$ for $1 > W$ where r is a positive constant. The function value ξ can be precisely set using the output signal from the carrier detector 69 (FIG. 6). The updated parameter is returned to the selector 1002 through the terminal 1006.

Figure 12:
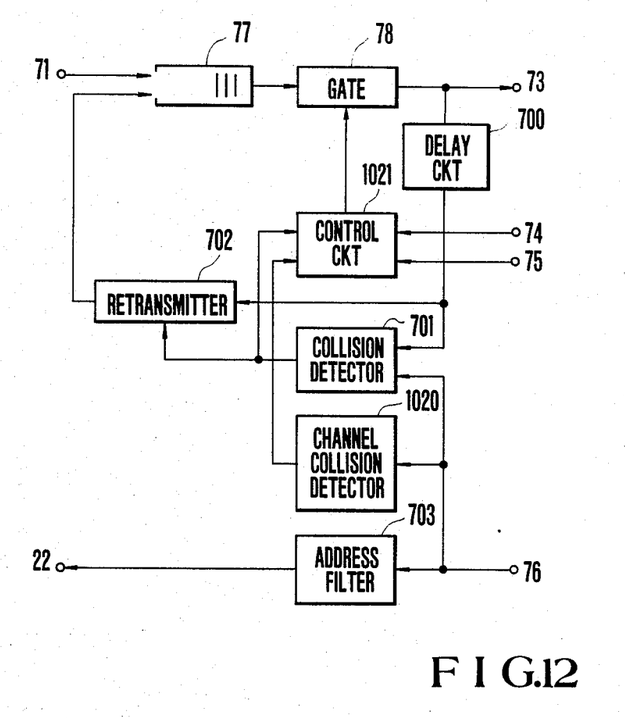
FIG. 12 is a block diagram showing a second embodiment of the network control section of the system shown in FIG. 5.

FIG. 12 is a block diagram of a second embodiment of the network control section 53. This network is substantially the same as that shown in FIG. 7, except that a channel collision detector 1020 is added, and that an output signal from the detector 1020 is supplied to a control circuit 1021 in place of the control circuit 79. The channel collision detector 1020 serves to detect errors in all received packets. When the channel collision detector 1020 detects a packet error, it determines that this packet is in collision with another packet. As a result, the channel collision detector 1020 generates a collision signal.

Figure 13:
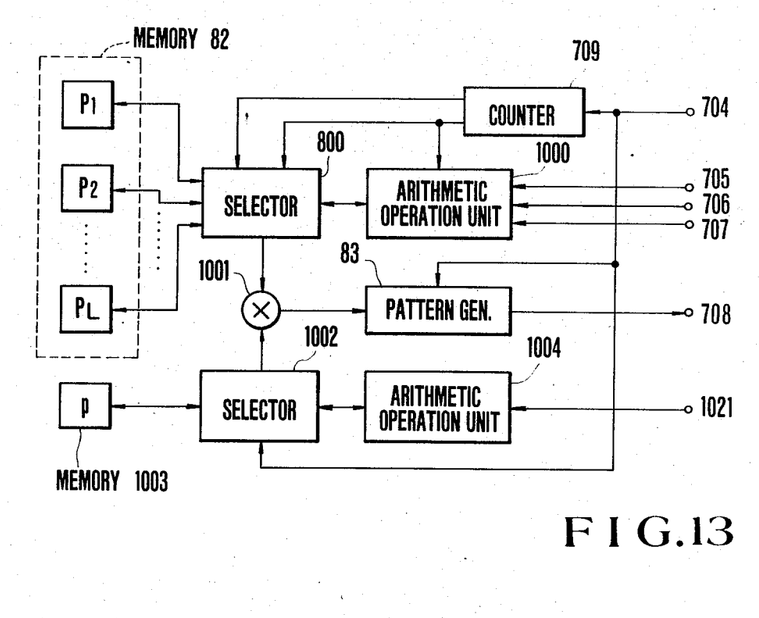
FIG. 13 is a block diagram of a control circuit in FIG. 12.

FIG. 13 is a block diagram of the control circuit 1021 shown in FIG. 12. The control circuit 1021 is substantially the same as the first embodiment of the control circuit 79 (FIG. 10), except that the control circuit 1021 receives the collision signal from the channel collision detector 1020 through a terminal 1021.

In the above embodiments, a plurality of channels are formed along the time base. However, the present invention can also be applied to a plurality of channels formed with respect to the frequency bandwidth.

What is claimed is:

1. A multiple access system for performing packet communication involving the sharing of a single communication medium by a plurality of users through a plurality of channels such that each user monitors the state of each channel and the probability of packet transmission is controlled in accordance with the monitored results comprising:

an interface section for linking data together as a packet;

a modem section for modulating/demodulating a packet, said modem section including
   a modulator for modulating the packet;
   a demodulator for demodulating a modulated packet to generate a demodulated signal; and
   a slot sync signal detector for receiving the demodulated signal to extract the slot sync signal constantly propagated along the channel;
   a carrier detector for detecting whether or not the channel is being used and for generating an empty or a busy signal;

a network control section for performing access control, said network control section including
   a collision detector for detecting a transmitting packet and a delayed receiving packet so as to detect a collision of the transmitting packet with another transmitting packet, said collision detector generating a success signal when the transmitting packet and the delayed receiving packet coincide with each other and a collision signal when the transmitting packet and the delayed receiving packet do not coincide, a retransmitter for retransmitting a packet identical with the transmitting packet when the transmitting packet collides with said delayed receiving packet, and a control circuit for receiving a slot sync pulse, a busy or empty signal, a success or collision signal, and a packet arrival pulse, and for generating a control signal to control packet transmission; and an RF section connected to said modem section for converting an IF signal to a high frequency transmission signal and vice versa.

2. A system according to claim 1, wherein said network control section further includes:

a buffer for supplying the packet arrival pulse to said control circuit every time said buffer receives the packet;

a gate circuit which is turned on in response to the control signal supplied from said control circuit thereto so as to pass the packet therethrough;

a delay circuit for delaying the packet from said gate circuit and for supplying a delayed packet to said retransmitter and said collision detector; and an address filter for receiving only the packet destined therefore and supplying the packet to said interface section.

3. A system according to claim 1 wherein said control circuit comprises:

a memory for storing parameter data the number of which corresponds to the number of the channels;

a counter for counting the slot sync pulse in units of one frame, and subtracting the number of slots corresponding to a transmission delay time from count data thereof so as to obtain subtracted data;

a selector for receiving the subtracted data and the count data and for reading out parameter data corresponding to the subtracted data and the count data;

an arithmetic operation unit for receiving the parameter data corresponding to the subtracted data, updating the parameter data, and supplying updated parameter data to said memory; and a pattern generator for receiving the parameter data corresponding to the count data and generating the control signal using as a probability the updated parameter data from said selector, thereby opening said gate circuit in accordance with said probability.

4. A system according to claim 1, wherein said control circuit comprises:

a first memory for storing parameter data the number of which corresponds to the number of the channels;

a second memory for storing single parameter data for controlling a sequence flow;

a counter for counting the slot sync pulse in units of one frame, subtracting a number of slots corresponding to a transmission delay time from count data thereof so as to obtain subtracted data;

a first selector for receiving the subtracted data and the count data and reading out parameter data corresponding to the subtracted data and the count data;

a first arithmetic operation unit for receiving the parameter data corresponding to the subtracted data, updating the parameter data, and supplying updated parameter data to said first memory;

a second selector for reading out the single parameter data from said second memory;

a second arithmetic operation unit for receiving and updating the single parameter data, thereby restoring updated single parameter data in said second memory;

a multiplier for multiplying the updated subtracted parameter data from said first selector by the updated single parameter data from said second selector; and a pattern generator for receiving multiplied parameter data from said multiplier and generating the control signal using as a probability the multiplied parameter data from said multiplier, thereby opening said gate from said multiplier, thereby opening said gate circuit in accordance with said probability.

5. A system according to claim 3 or 4, wherein said arithmetic operation unit comprises:

a function generator for generating a function value $\delta(\delta=1$ under a first condition that one of the empty and success signals is detected; $\delta=-1$ under a second condition excluding the first condition); and a first arithmetic logic circuit for receiving the function value $\delta$ so as to perform an operation $P_l \leftarrow P_l + \alpha\delta$ where $l=1 \ldots L$, L being the number of channels, $0 \leq P_l \leq 1$, and $\alpha$ is a small positive number.

6. A system according to claim 5 further comprising:

a second arithmetic operation circuit for performing an operation $\lambda \leftarrow \lambda - \beta(\Sigma P_l - 1)$ where $\lambda$ is a Lagrangian constant, $0 \leq \lambda$, and $\beta$ is a small positive number; and a third arithmetic operation circuit for computing the Lagrangian constant $\lambda$ in accordance with $\lambda \leftarrow \min(\lambda, \lambda_0)$ for $\lambda_0 \lesssim 1$, whereby said first arithmetic operation circuit is caused to perform an operation $P_l \leftarrow P_l + \alpha(\delta + \lambda)$.

7. A system according to claim 6 further comprising an averaging circuit for producing $\hat{\sigma} L$ where $\hat{\sigma}$ is an average of the number of input packet arrival pulses, whereby said second arithmetic operation circuit performs an operation $$\lambda \leftarrow \lambda - \beta(\Sigma P_l - \hat{\sigma} L)$$

8. A multiple access system for performing packet communication involving the sharing of a single communication medium by a plurality of users through a plurality of channels such that each user monitors the state of each channel and the probability of packet transmission is controlled in accordance with the monitored results comprising:

an interface section for linking data together as a packet;

a modem section for modulating/demodulating a packet, said modem section including a modulator for modulating the packet;

a demodulator for demodulating a modulated packet to generate a demodulated signal; and a slot sync signal detector for receiving the demodulated signal to extract the slot sync signal constantly propagated along the channel;

a carrier detector for detecting whether or not the channel is being used and for generating an empty or a busy signal;

a network control section for performing access control, said network control section including a collision detector for detecting a transmitting packet and a delayed receiving packet so as to detect a collision of the transmitting packet with another transmitting packet, said collision detector generating a success signal when the transmitting packet and the delayed receiving packet coincide with each other and a collision signal when the transmitting packet and the delayed receiving packet do not coincide;

a channel collision detector for detecting whether a collision occurs between received packets, said control circuit receiving a collision signal from said channel collision detector;

a retransmitter for retransmitting a packet identical with the transmitting packet when the transmitting packet collides with said delayed receiving packet, and a control circuit for receiving a slot sync pulse, a busy or empty signal, a success or collision signal, and a packet arrival pulse, and for generating a control signal to control packet transmission; and an RF section connected to said modem section for converting an IF signal to a high frequency transmission signal and vice versa.

9. A system according to claim 8, wherein said network control section further includes:

a buffer for supplying the packet arrival pulse to said control circuit every time said buffer receives the packet;

a gate circuit which is turned on in response to the control signal supplied from said control circuit so as to pass the packet therethrough;

a delay circuit for delaying the packet from said gate circuit and for supplying a delayed packet to said retransmitter and said collision detector; and an address filter for receiving only the packet destined thereto and supplying the packet to said interface section.

10. A system according to claim 8, wherein said control circuit comprises:

a first memory for storing parameter data the number of which corresponds to the number of the channels;

a second memory for storing single parameter data for controlling a sequence flow;

a counter for counting the slot sync pulse in units of one frame, subtracting a number of slots corresponding to a transmission delay time from count data thereof so as to obtain subtracted data;

a first selector for receiving the subtracted data and the count data and reading out parameter data corresponding to the subtracted data and the count data;

a first arithmetic operation unit for receiving the parameter data corresponding to the subtracted data, updating the parameter data, and supplying updated parameter data to said first memory;

a second selector for reading out the single parameter data from said second memory;

a second arithmetic operation unit for receiving and updating the single parameter data, thereby restoring updated single parameter data in said second memory;

a multiplier for multiplying the updated subtracted parameter data from said first selector by the updated single parameter data from said second selector; and a pattern generator for receiving multiplied parameter data from said multiplier and generating the control signal using as a probability the multiplied parameter data from said multiplier, thereby opening said gate circuit in accordance with the probability.

11. A system according to claim 4 or 10, wherein said second arithmetic operation circuit comprises:

a function generator for generating a function value $\xi(\xi=-1$ under a first condition that the collision signal is detected; $\xi=\xi_0>0$ under a second condition excluding the first condition); and an arithmetic logic circuit for receiving and updating the function value $\xi$ in accordance with the updated single parameter data so as to perform an operation $P \leftarrow P + r\xi$ (where P is the single parameter data $0 \leq P \leq 1$, $\xi$ is the function value, and r is a small positive number.

* * * * *